(12) United States Patent
Morgan

(10) Patent No.: US 8,944,106 B2
(45) Date of Patent: Feb. 3, 2015

(54) SLIDE LOCK GAS DELIVERY SYSTEM

(75) Inventor: Daniel P. Morgan, Vacaville, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 332 days.

(21) Appl. No.: 13/505,202

(22) PCT Filed: Oct. 29, 2010

(86) PCT No.: PCT/US2010/054593
§ 371 (c)(1),
(2), (4) Date: Apr. 30, 2012

(87) PCT Pub. No.: WO2011/059783
PCT Pub. Date: May 19, 2011

(65) Prior Publication Data
US 2012/0211100 A1    Aug. 23, 2012

Related U.S. Application Data

(60) Provisional application No. 61/256,254, filed on Oct. 29, 2009.

(51) Int. Cl.
*F16K 3/26*      (2006.01)
*F16K 27/00*    (2006.01)

(52) U.S. Cl.
CPC .................................. *F16K 27/003* (2013.01)
USPC ......................... 137/884; 137/315.01; 285/18

(58) Field of Classification Search
USPC ................... 137/315.01, 884; 285/18; 403/24
See application file for complete search history.

(56) References Cited

U.S. PATENT DOCUMENTS

| 2,761,714 | A  | * | 9/1956 | Cuskie .......................... 403/225 |
| 5,732,744 | A  | * | 3/1998 | Barr et al. ..................... 138/106 |
| 6,170,516 | B1 | * | 1/2001 | Sakata et al. .................. 137/343 |
| 6,539,971 | B2 | * | 4/2003 | Moreno et al. ........... 137/315.03 |
| RE41,299  | E  | * | 5/2010 | Atkin et al. .............. 137/315.01 |
| 7,726,333 | B2 |   | 6/2010 | Hoshi et al. |

FOREIGN PATENT DOCUMENTS

| DE | 2310698 | 12/1973 |
| EP | 1167846 | 1/2002 |
| JP | HEI 10-131936 | 5/1998 |

(Continued)

OTHER PUBLICATIONS

International Search Report for corresponding patent application No. PCT/US2010/054593 dated Feb. 11, 2011.

(Continued)

*Primary Examiner* — John Fox
(74) *Attorney, Agent, or Firm* — Renner, Otto, Boisselle & Sklar, LLP

(57) ABSTRACT

A gas supply system that is easily assembled and/or installed and includes an initially flexible clamping system that allows for the gas supply system to adapt to the gas components. As the assembly of the gas components is complete, the clamping system becomes rigid thereby securing the gas components to a support rail. The slide lock gas delivery system allows a gas system component bottom surface to establish the sealing plane for the inlet and outlet seals independently. The lateral spacing for the gas component mounting holes float during assembly to reduce the opportunity for misalignment.

22 Claims, 12 Drawing Sheets

(56) References Cited

FOREIGN PATENT DOCUMENTS

| | | |
|---|---|---|
| JP | 2002-267100 | 9/2002 |
| JP | 2006-46502 | 2/2006 |
| WO | 99/02867 | 1/1999 |

OTHER PUBLICATIONS

Japanese Office Action and translation for corresponding Japanese Patent Application No. 2012-537085 dated Aug. 4, 2014.

* cited by examiner

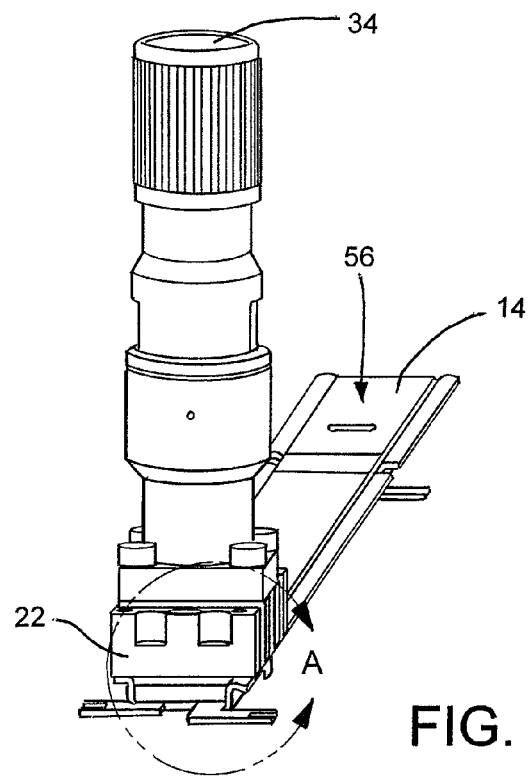
Heat rises to
Efficiently heat the
gas flow passages.
FIG. 12
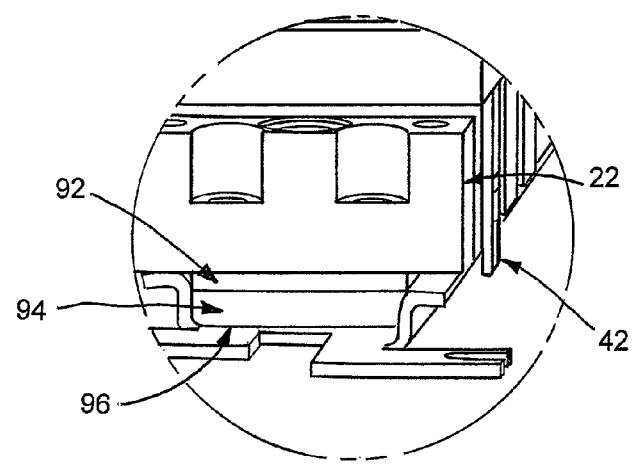
FIG. 13          Detail A

SLIDE LOCK GAS DELIVERY SYSTEM

This application is a national phase of International Application No. PCT/US2010/054593 filed Oct. 29, 2010 and published in the English language, which claims the benefit of U.S. Provisional Application No. 61/256,254 filed Oct. 29, 2009, all of which are hereby incorporated herein by reference.

FIELD OF THE INVENTION

The present invention relates generally to gas delivery systems and, more particularly, to systems for connecting gas components.

BACKGROUND OF THE INVENTION

Gas delivery systems are used for the distribution of gases for the fabrication of semiconductor devices. The gases used in the fabrication of semiconductor devices are often highly toxic or corrosive. Many of these materials are drawn as a vapor from a liquid source and must be heated to prevent the vapor from condensing back to a liquid form. These systems require a high degree of modularity, very good leak integrity and must occupy a very small footprint. A typical method of accomplishing these requirements is through a surface mount system.

Surface mount systems typically require a fitting or block to bring the process gas from the outlet of one component to the inlet of the next component in the system. Typical systems couple two manifold blocks together such that they establish a common plane for both inlet and outlet seals. As will be appreciated, this can require tight tolerances of the components in order to ensure alignments of the ports of the manifold blocks with the ports of the gas component. Current systems are fabricated by mounting the manifold substrates down to a metal plate using templates to establish the appropriate substrate locations. This is very time consuming and, since these systems can be quite large with 16 separate gas lines being common, for example, it is typical to make this lower metal plate from aluminum. While aluminum helps to keep down the weight, it acts as a heat sink to draw away heat from the components that require heating.

While there are many variations of such systems available on the market today, such systems generally require very tight machining tolerances, are slow and/or difficult to assemble and can be difficult to heat. Moreover, such systems tend to be expensive.

SUMMARY OF THE INVENTION

The present invention provides a gas supply system that is easily assembled and/or installed and includes an initially flexible clamping system that allows for the gas supply system to adapt to the gas components. As the assembly of the gas components is complete, the clamping system becomes rigid thereby securing the gas components to a support rail. The system eliminates the need for very precise and time consuming layouts of a mounting plate for accommodating typical manufacturing tolerances. The slide lock gas delivery system allows the gas system component bottom surface to establish the sealing plane for the inlet and outlet seals independently. Also, the lateral spacing for the gas component mounting holes are allowed to 'float' during assembly such that the mounting holes do not have to be tightly tolerated and there is reduced opportunity for misalignment, which can stress the metal to metal seals.

In accordance with one aspect of the invention, a gas delivery system comprises a rail for supporting at least one manifold block, first and second manifold blocks each having at least one port for connection to a gas component, a gas component, securable to the first and second manifold blocks and having a mount surface with first and second ports for communicating with respective ports of the first and second manifold blocks when secured thereto, and a slide lock member for securing the first and second blocks to the rail. The slide lock member is configured to secure the first and second manifold blocks to the rail under a first level of preload for assembly of the gas component to the manifold blocks, and to secure the first and second manifold blocks to the rail with a second level of preload greater than the first level when the gas component is secured to the manifolds.

The slide lock member also can act as a spacer block to set the appropriate, approximate spacing between the first and second manifold blocks. Accordingly, the slide lock member can include both a slide lock clip portion for engaging the rail, and a spacer block portion for spacing the manifold blocks. The spacer block portion can be separate from the slide lock clip portion or formed integrally therewith. The slide lock member can include a set of protrusions to mate with a corresponding set of recesses in the manifold blocks to thereby interlock the slide lock member with the manifold blocks.

In one embodiment, the spacer block portion supports the slide lock clip portion in a symmetric fashion, approximately $\frac{1}{3}$ of the distance from the slide lock clip center towards either clip end. The slide lock clip ends are deformed downwards, towards the rail at assembly until the slide lock clip portion engages the rail. Because the spacer block portion supports the slide lock clip at two fulcrum points, off center, the slide lock clip center is raised up when the edges are depressed down to engage the rail. This is essentially equivalent to a pair of 'simply supported' cantilever beams, guided at the center. A cantilever beam that is supported in this manner provides a relatively light holding force. In the case of the present invention, the result is that the slide lock member and the gas manifold blocks can self adjust their position to follow the position of the gas component as the gas component is installed to the manifold blocks.

As the gas component assembly is being completed, the final increment of movement of the gas component down to the manifold blocks, causes the gas component bottom surface to contact the raised center portion of the slide lock clip and drive it down flush or below the two fulcrum points. This final slide lock clip position is now essentially equivalent to a pair of cantilever beams that have fixed supports. Cantilever beams supported in this manner require essentially 2× the force to maintain the position of the deflected beam ends as initial.

The slide lock clip can have a central portion and respective leg portions extending from the central portion for engaging the rail thereby trapping the at least one manifold block between the slide lock member and the rail. The central portion can include a deflectable portion that, when deflected, increases tension on at least one of the leg portions to thereby increase the preload to the second level. The slide lock clip can be generally C-shape, and at least one distal end of the slide lock clip can include an interlock mechanism for interlocking with a surface of the rail. The slide lock clip and spacer block can be formed as a unitary piece. The rail can include a longitudinally extending channel between laterally spaced-apart manifold block support surfaces, and a heating element in the channel for providing heat to the gas components.

According to another aspect, a modular gas supply manifold system comprises a rail for supporting at least one manifold block, a manifold block having at least one port for connection to a gas component, and a slide lock member for securing the manifold block to the rail. The slide lock member is configured to secure the manifold block to the rail under a first level of preload to facilitate securing a gas component to the manifold block, and to secure the manifold block to the rail under a second level of preload greater than the first level when the gas component is secured to the manifold.

The slide lock member can include a slide lock clip and a spacer block for supporting the slide lock member. The spacer block can support the slide lock clip at a central portion thereof at two support locations. The support locations can be spaced apart from a longitudinal axis of the rail.

The slide lock member can have a central portion and respective leg portions extending from the central portion for engaging the rail thereby trapping the at least one manifold block between the slide lock member and the rail. The central portion can include a deflectable portion that, when deflected, increases tension on at least one of the leg portions to thereby increase the preload to the second level. The slide lock member can slidingly engage at least one of the rail or the manifold block to permit relative movement therebetween when under the first level of preload.

The system can also include a spacer block configured to space apart the first and second manifold blocks a predetermined distance on the rail. The spacer block can include a recess or protrusion for mating with a corresponding recess or protrusion on at least one of the first and second manifold blocks to thereby interlock the spacer block with the manifold block. The spacer block can support the central portion of the slide lock member near its outer edges to permit deflection of the central portion when the gas component is attached to the manifold blocks. The spacer block can be deformable to allow relative movement between the first and second manifold blocks during attachment of the gas component. The slide lock member and spacer block can be formed as a unitary piece. The slide lock member can be generally C-shape, and at least one distal end of the slide lock member can include an interlock mechanism for interlocking with a surface of the rail. The rail can include a longitudinally extending channel between laterally spaced-apart manifold block support surfaces, and a heat strip in the channel for providing heat to the gas components.

According to another aspect, a slide lock member for securing a manifold block to a rail of a modular gas supply manifold comprises a central spacer portion for spacing apart a first and second manifold block on the rail, and leg portions extending from the central spacer portion and adapted to engage the rail of a gas supply system. The slide lock member is configured to secure the manifold block to the rail under a first level of preload to facilitate securing a gas component to the manifold block, and wherein the slide lock member is configured to secure the manifold block to the rail under a second level of preload greater than the first level when a gas component is secured to the manifold. The central spacer portion can include a recess or protrusion for interlocking with a manifold block. The central spacer portion can be deformable to allow relative movement between the first and second manifold blocks during attachment of a gas component thereto. The slide lock member can be generally C-shape, and at least one distal end of the slide lock member includes an interlock mechanism for interlocking with a surface of the rail when mounted thereto.

According to another aspect, a method of assembling a gas delivery system comprises the steps of mounting first and second manifold blocks to a support rail with a slide lock member, each of the first and second manifold blocks having at least one port for communicating with a port of a gas component, the slide lock member being adapted to secure the first and second manifold blocks to the rail with a first amount of preload, and mounting a gas component to the first and second manifold blocks. The slide lock member is configured to secure the first and second manifold blocks to the rail under a first level of preload for assembly of the gas component to the manifold blocks, the first level of preload permitting relative, and wherein the slide lock member secures the first and second manifold blocks to the rail with a second level of preload greater than the first level when the gas component is mounted to the manifolds.

Further features of the invention will become apparent from the following detailed description when considered in conjunction with the drawings.

BRIEF DESCRIPTION OF THE DRAWINGS

FIG. 12 is a perspective view of another exemplary slide lock gas delivery system.

FIG. 13 is an enlarged portion of the slide lock gas delivery system of FIG. 12.

DETAILED DESCRIPTION

Figure 1:
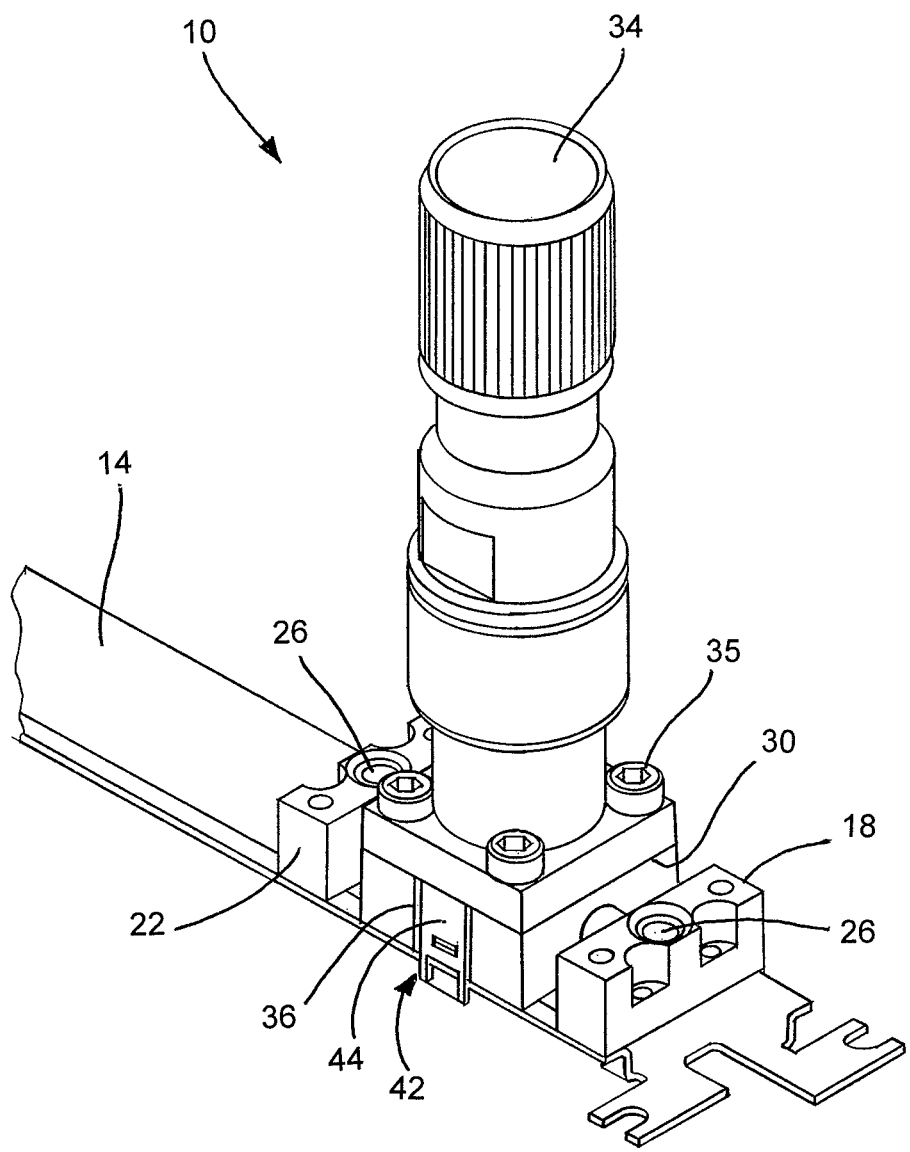
FIG. 1 is an exemplary slide lock gas delivery system having a gas component secured to first and second manifold blocks on a rail in accordance with the invention.
Figure 2:
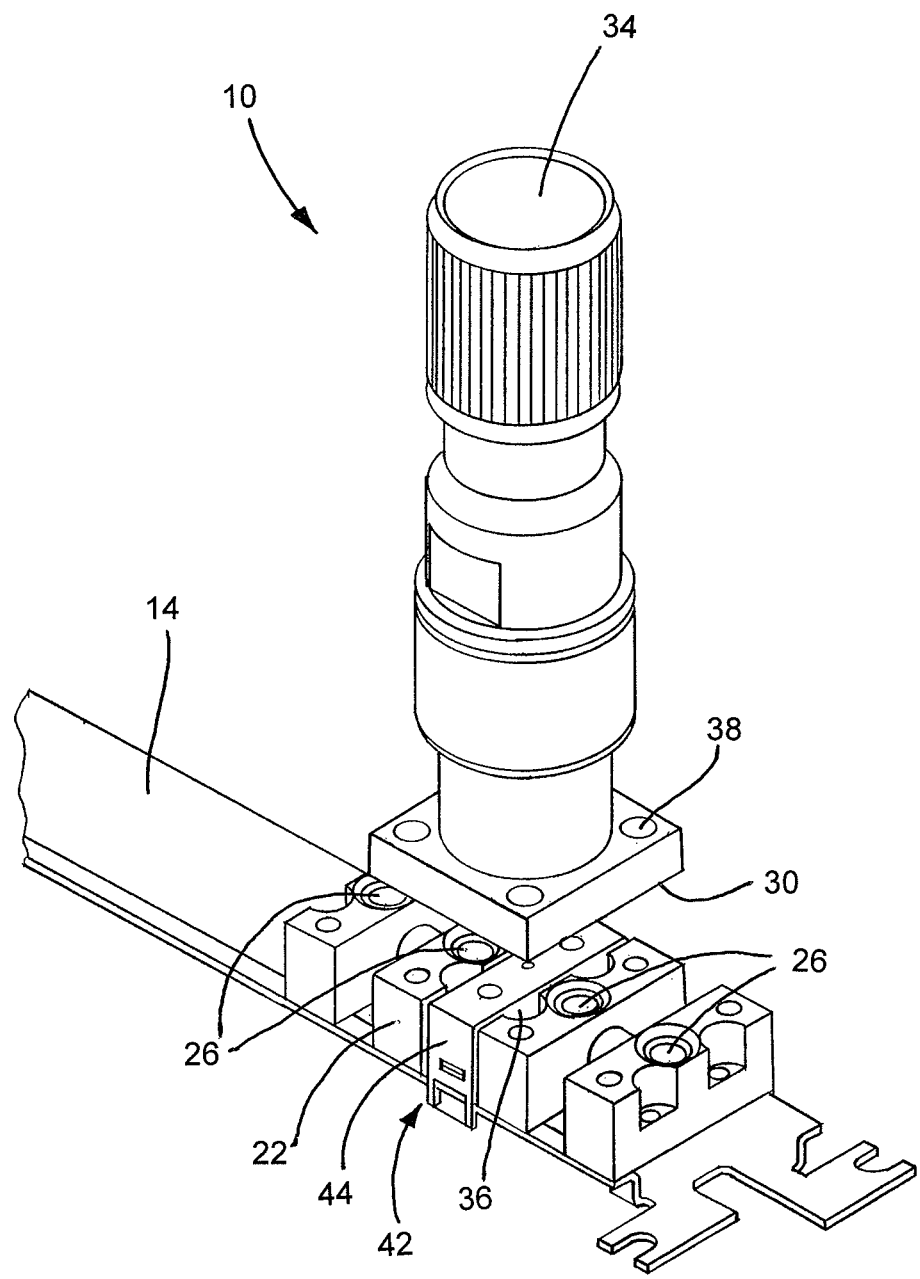
FIG. 2 is the slide lock gas delivery system of FIG. 1 with the gas component separated from the manifold blocks.

Turning to the drawings in detail, and initially to FIGS. 1 and 2, an exemplary slide lock gas delivery system is indicated generally by reference numeral 10. The system 10 includes a rail 14 for supporting first and second manifold blocks 18 and 22 The manifold blocks 18 and 22 each have at least one port 26 adapted for connection to respective ports on a mount surface 30 of a gas component 34. The gas component 34 is secured to the first and second manifold blocks 18 and 22 via bolts 35, or other suitable fasteners, that may extend through bores 38. A slide lock member 42 including a spacer block portion 36 and a slide lock clip portion 44 secures the first and second manifold blocks 18 and 22 to the rail 14. As will be appreciated, a plurality of manifold and gas component assemblies can be provided on the rail 14 in accordance with the invention.

As will be described in greater detail herein, the slide lock member 42 is configured to secure the first and second manifold blocks 18 and 22 to the rail 14 under a first level of preload for assembly and securing of the gas component 34 to the manifold blocks 18 and 22, and to secure the first and second manifold blocks 18 and 22 to the rail 14 with a second level of preload greater than the first level when the gas component 34 is secured to the manifolds via bolts or the like. Moreover, by lightly holding the manifold blocks 18 and 22 to the rail 14, the slide lock member 42 allows the ports 26 of the manifold blocks 18 and 22 to self-align with the ports of the gas component 34 as the gas component 34 is tightened down onto the manifold blocks 18 and 22.

Figure 3:
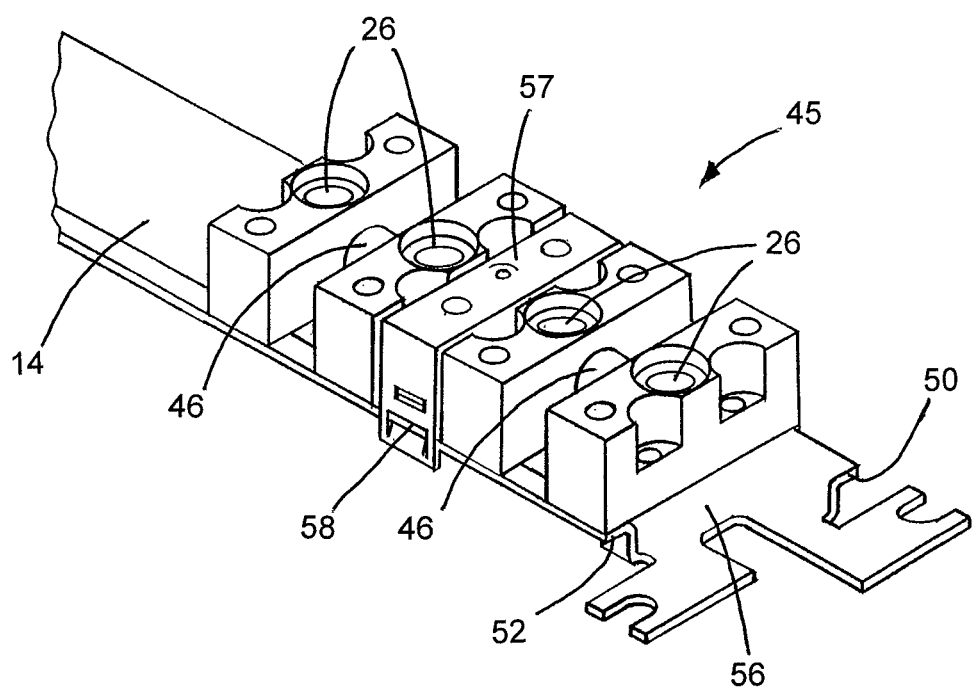
FIG. 3 is a perspective view of an exemplary slide lock manifold including a slide lock member in accordance with the invention.

Turning now to FIG. 3, a gas manifold assembly, generally indicated by reference numeral 45, of the slide lock system 10 is illustrated with the gas component 34 removed. Each manifold block 18 and 22 in the illustrated embodiment includes first and second halves, each half having a port 26. A tubular portion 46 connects the first and second halves together and provides a passageway for the flow of fluid between the two ports 26 of each manifold block. Such manifold blocks 18 and 22 are sometimes referred to as H-blocks, and are often made by welding the tube stub (e.g., tubular portion) of each half together.

The manifold blocks 18 and 22 rest on manifold support surfaces 50 and 52 of the rail 14. The manifold support surfaces 50 and 52 in the illustrated embodiment are at laterally outer edges of the rail 14. Between the manifold support surfaces 50 and 52 is a longitudinally extending channel 56. Supporting the manifold blocks 18 and 22 in this manner creates air space around the manifold blocks thereby limiting the surface area available for thermal conduction between the manifold blocks and the rail 14. The manifold blocks are secured to rail 14 by the slide lock member 42.

The slide lock member 42 in the exemplary embodiment includes the generally C-shape slide lock clip 44 having a central portion 57 and leg portions 58 engaged with the rail 14. The leg portions 58 each have an engagement mechanism, in the form of tabs 62 (see FIG. 4), that interlock with an edge of the rail 14 to thereby secure the slide lock member 42 thereto. As will be appreciated, the slide lock member 42 is installed on the rail 14 by slipping the leg portions 58 of the slide lock clip portion 44 over the edge of the rail 14, as best seen in FIG. 5. In this regard, the slide lock clip portion 44 can be sized such that the legs 58 can be compressed slightly in order for the tabs 62 to engage the rail. Once engaged, the slide lock member 42 then applies a first level of preload to the manifold blocks 18 and 22 thereby securing the manifold blocks 18 and 22 to the rail 14.

As will be appreciated, this first level of preload typically will be sufficient to maintain the manifold blocks 18 and 22 at an approximate position on the rail 14 for subsequent installation of the gas component 34 to the manifold blocks 18 and 22. Further, the level of preload may generally permit relative movement between the manifold blocks 18 and 22 and/or the rail 14 such that final alignment of the ports 26 of the manifold blocks 18 and 22 with the ports of the gas component 34 can occur during attachment of the gas component 34 itself, thus greatly reducing the tolerances needed in the manufacture of the manifold blocks 18 and 22 and/or gas component 34.

Figure 4:
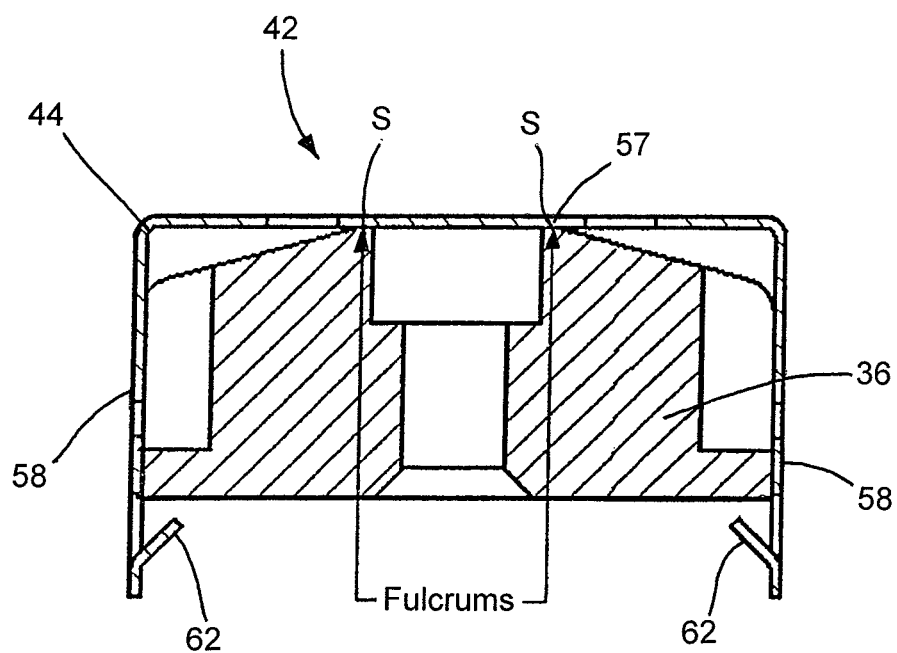
FIG. 4 is a cross-sectional view of the slide lock member of FIG. 3.
Figure 5:
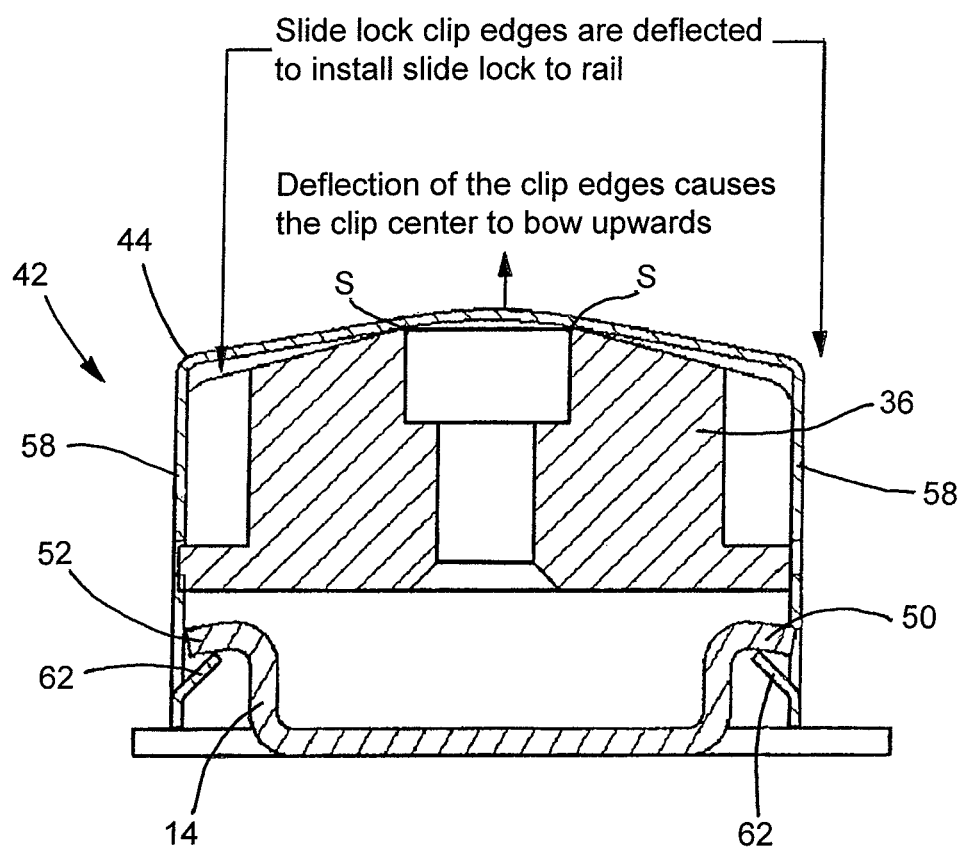
FIG. 5 is another cross-sectional view of the slide lock member of FIG. 3 installed on a rail.

Turning to FIG. 4, the slide lock member 42 is shown in cross-section. As will be appreciated, in this embodiment, the slide lock clip portion 44 is supported by the spacer block portion 36 at two locations labeled S in the drawing. The spacer block portion 36 supports the slide lock clip portion 44 in a symmetric fashion, approximately ⅓ of the distance from the slide lock clip center towards either clip end.

In FIG. 5, the slide lock member 42 is shown installed on a rail 14. As will be appreciated, in order to install the slide lock member 42, the ends of the central portion 57 of the slide lock clip member 44 are deformed downwards towards the rail 14 assembly until the slide lock clip portion 44 engages the rail 14. Because the spacer block portion 36 supports the slide lock clip 44 at two fulcrum points, off center, the slide lock clip center is raised up when the edges are depressed down to engage the rail 14 thereby generating a preload when released. This corresponds to the first level of preload.

For example, slide lock clip 44 is essentially equivalent to a pair of 'simply supported' cantilever beams, guided at the center. A cantilever beam that is supported in this manner provides a relatively light holding force. In the case of the present invention, the result is that the slide lock member 42 and the gas manifold blocks can self adjust their position to follow the position of the gas component as the gas component is installed. As will be appreciated, the support configuration can be altered depending on the desired preload effects. For example, three support locations could be provided, or the support locations could be in different planes.

Figure 6:
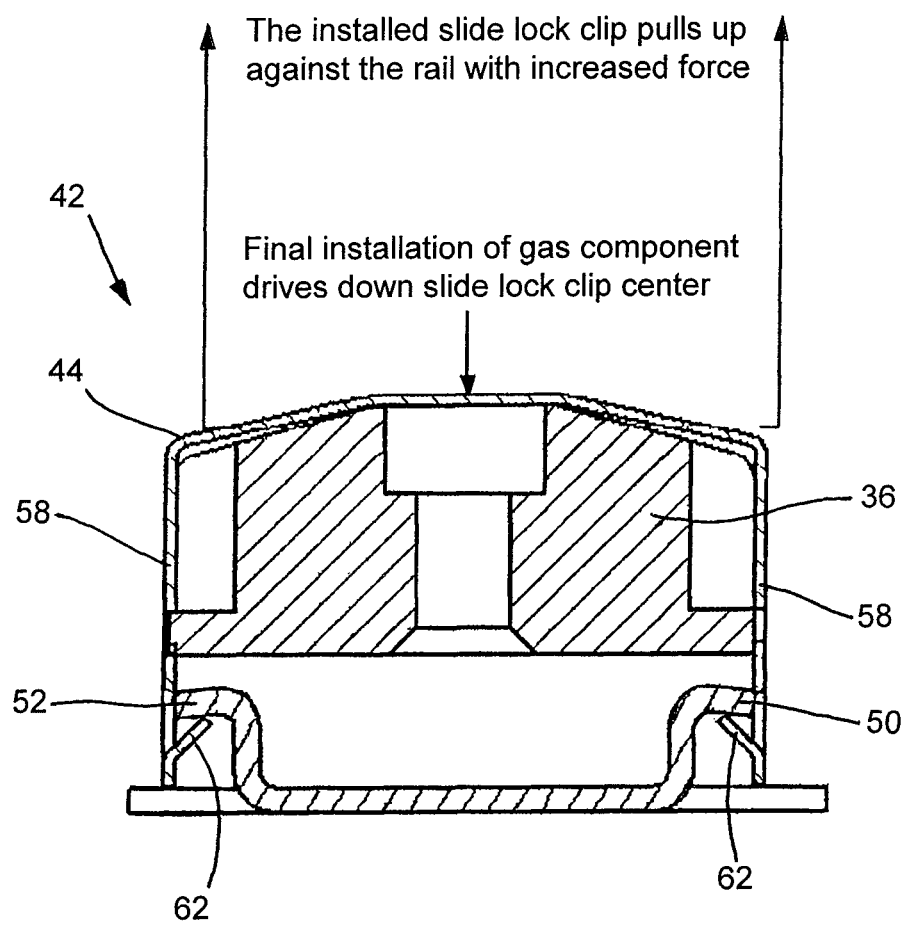
FIG. 6 is a cross-sectional view illustrating the final configuration of the slide lock member when a gas component is installed.

Turning to FIG. 6, the slide lock member 42 is illustrated as it would appear with a gas component secured to adjacent manifold blocks (e.g., as shown in FIG. 1). The gas component is not shown in FIG. 6 for clarity. As the gas component assembly to the manifold blocks is being completed, the final increment of movement of the gas component down to the manifold blocks causes the gas component bottom surface (e.g., mount surface) to contact the raised center portion of the slide lock clip 44 and drive it down flush or below the two fulcrum points S. This final slide lock clip 44 position is now essentially equivalent to a pair of cantilever beams that have fixed supports. Cantilever beams supported in this manner require essentially 2× the force to maintain the position of the deflected beam ends as initial. Accordingly, the holding force applied by the slide lock member 42 to the manifold blocks to the rail 14 will be approximately twice as great as the holding force in FIG. 5, and corresponds to the second level of preload.

Figure 7:
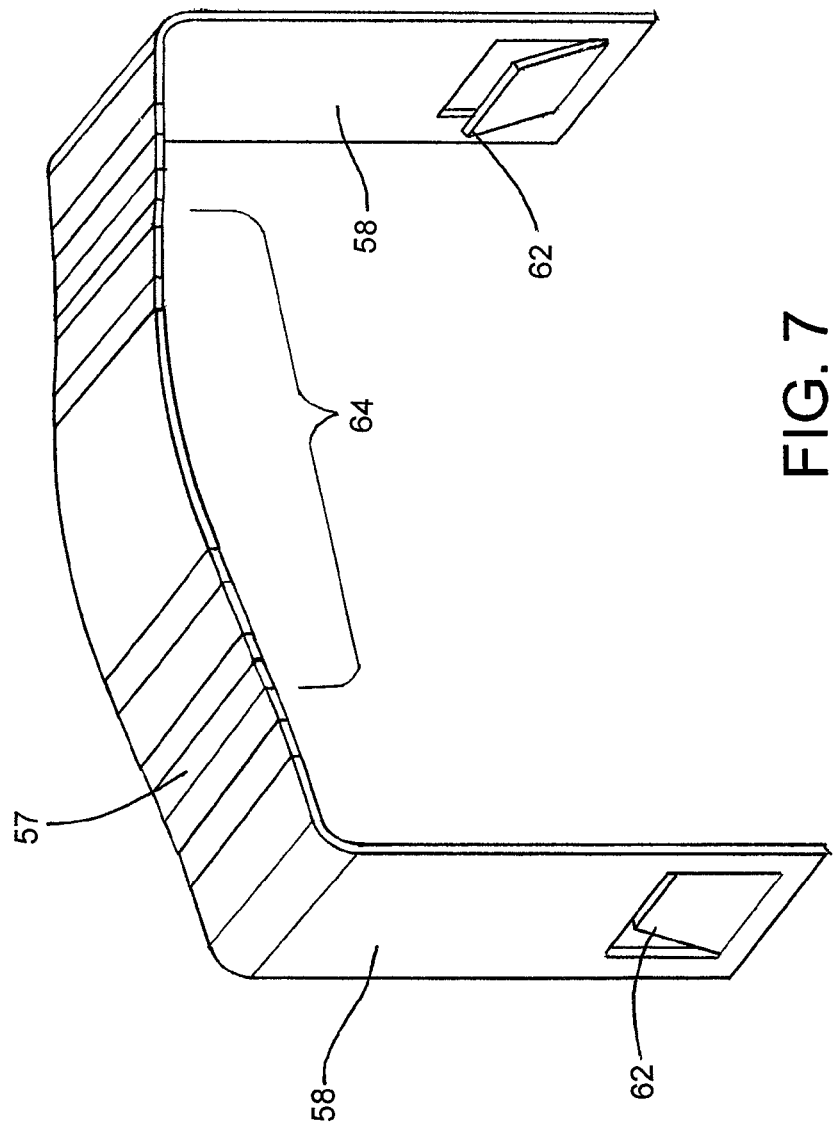
FIG. 7 is an enlarged view of an exemplary slide lock clip in a first state.

Turning to FIG. 7, an exemplary slide lock clip member 44 is illustrated in detail in as it may appear when secured to the rails 14 but before the gas component is installed on the manifold blocks. As mentioned, the slide lock clip is generally C-shape and includes the central portion 57 and leg portions 58 extending from the central portion 57. Tabs 62 are provided on the leg portions 58 for engaging the rail 14 as described. The central portion 57 includes a deflectable portion 64 thereof that, in the exemplary embodiment, is generally bow shape but other shapes can be utilized. This deflectable portion 64 can be deflected during installation of the slide lock member 42 to the rail 14 and can thereby provide the first level of preload to secure the manifolds 18 and 22 to the rail 14. As noted, when the gas component 34 is secured to the manifold blocks 18 and 22, the deflectable portion is compressed between the spacer block portion 36 and the mount surface 30 of the gas component 34, and the amount of preload is increased to a second level greater than the first level.

Figure 8:
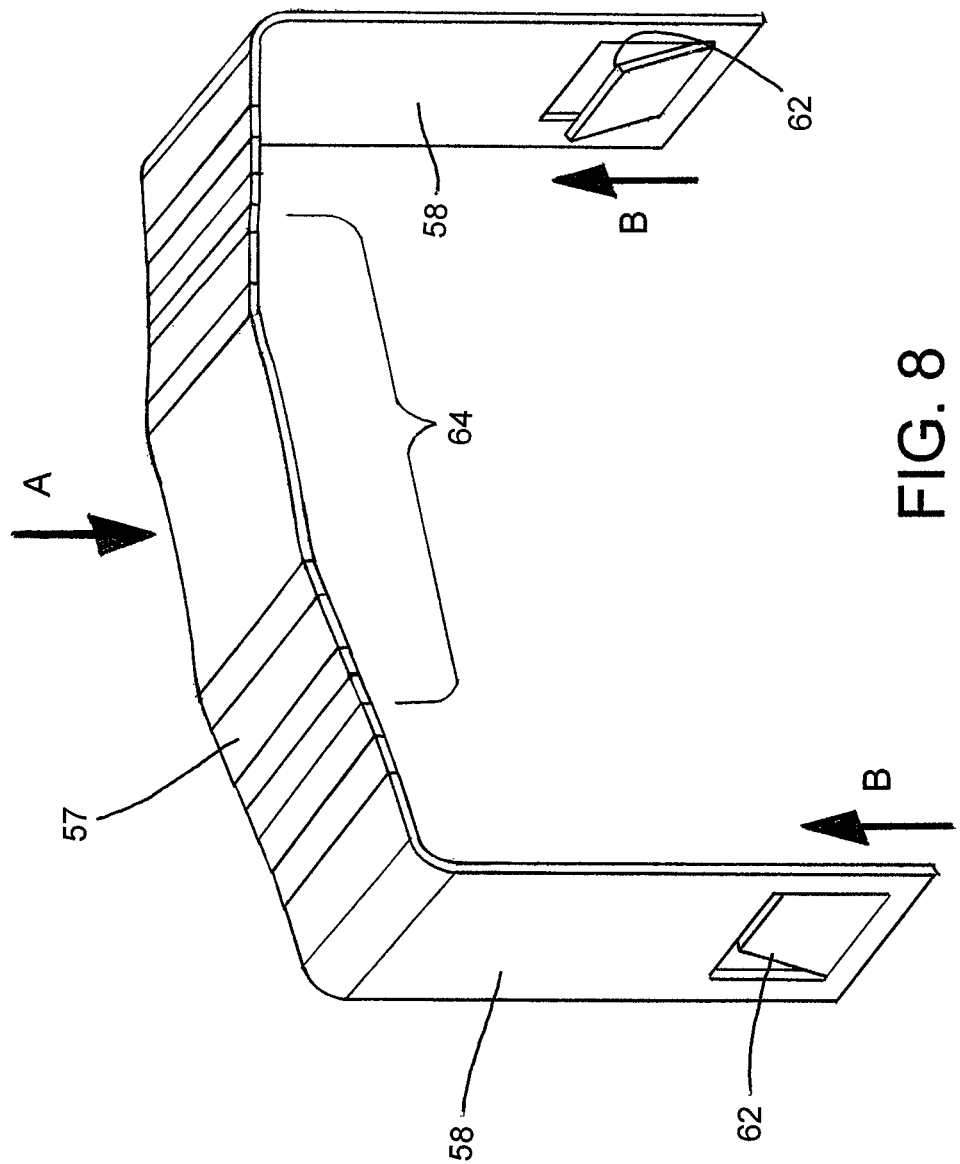
FIG. 8 is an enlarged view of an exemplary slide lock clip in a second state.

Turning to FIG. 8, the slide lock clip 44 is illustrated as it may appear when the gas component 34 is secured to the manifold blocks 18 and 22. As indicated by arrow A, the deflectable portion 64 has been compressed downward by the gas component. Due to the shape of the slide lock clip 44 and the manner in which it is supported by the spacer block 36, the downward deflection of the deflectable portion 64 causes the legs 58 to draw upward in the direction of arrows B, thereby increasing the preload applied to the manifold blocks 18 and 22 by the slide lock member 42 when the gas component 34 is bolted to the manifold blocks 18 and 22.

Figure 9:
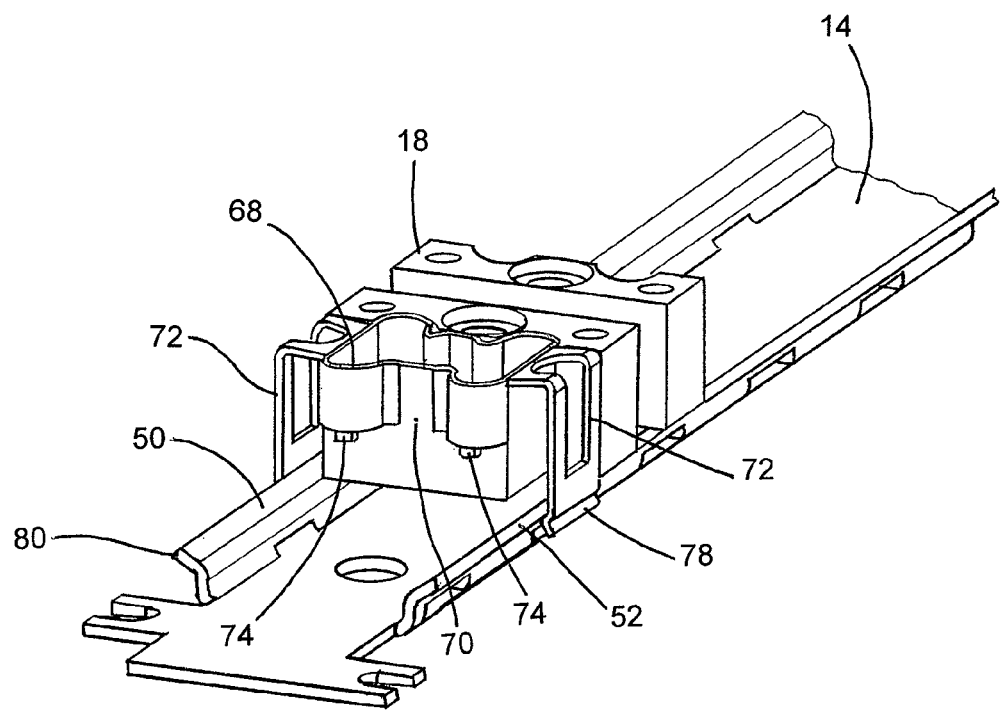
FIG. 9 is a perspective view of another exemplary slide lock gas delivery system, partially assembled, in accordance with the invention.
Figure 10:
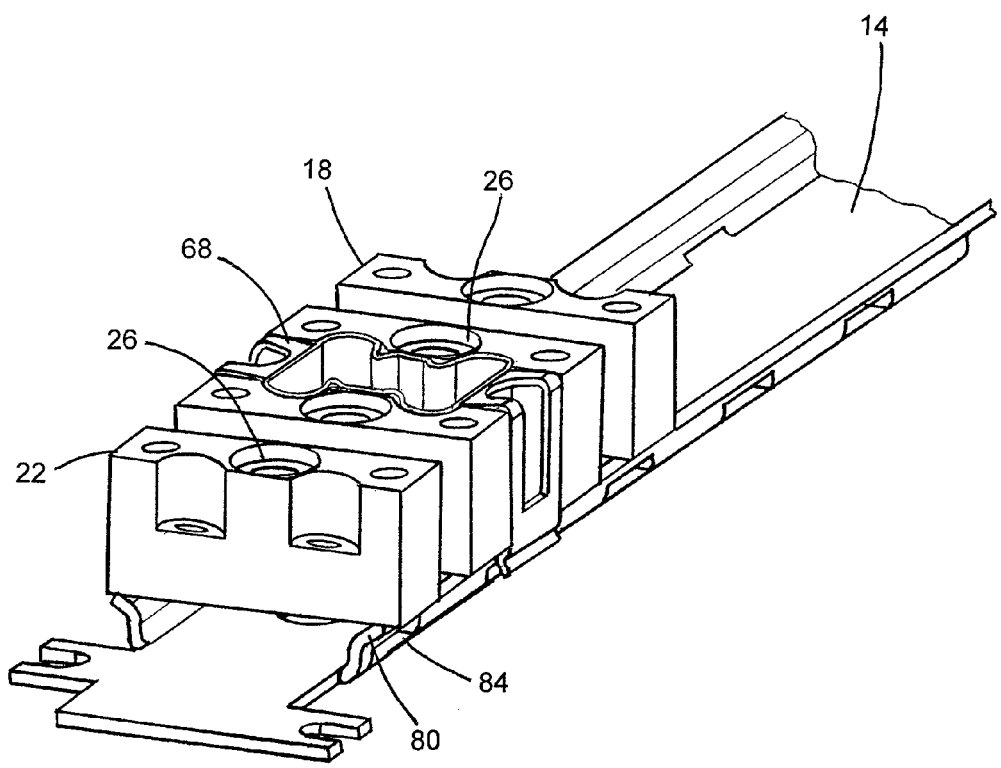
FIG. 10 is another perspective view of a partially assembled exemplary slide lock gas delivery system in accordance with the invention.
Figure 11:
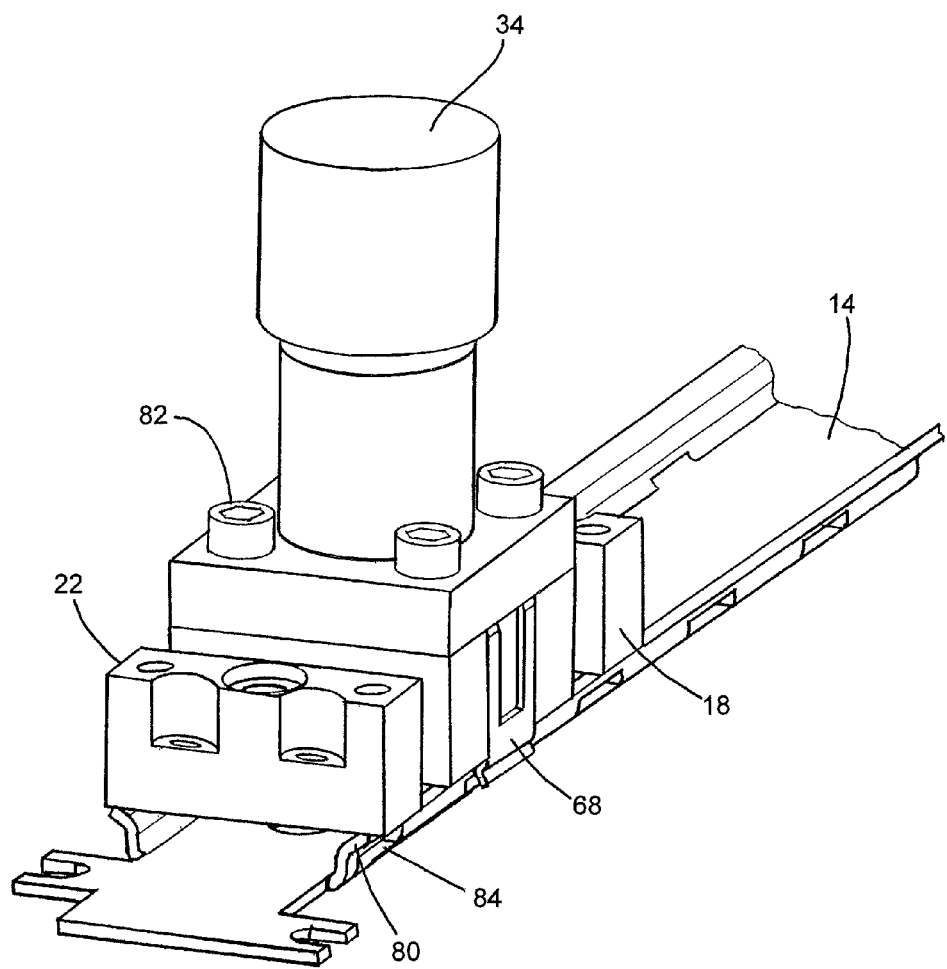
FIG. 11 is a perspective view of the slide lock gas delivery system of FIGS. 6 and 7 with a secured gas component.

Turning now to FIGS. 9-11, and initially to FIG. 9, another embodiment of the slide lock gas delivery system is shown in various stages of assembly. In FIG. 9, a manifold block 18 and an integral spacer block/slide lock member 68 are supported on the rail 14. In general, both manifold blocks 18 and 22 will be placed on the rail 14 and then the integral slide lock member 68 will be installed thereto. In order to show details of the integral slide lock member 68, however, the second manifold block 22 has been removed from FIG. 9.

The integral slide lock member 68 includes a central spacer block portion 70 and leg portions 72 extending from the central spacer portion 70. The central spacer block portion 70 is configured to space-apart the manifold blocks 18 and 22 and has locating studs 74 for engaging respective recesses (not shown) in the manifold blocks 18 and 22 to thereby interlock the manifold blocks 18 and 22 with the integral slide lock member 68. The leg portions 72 engage the rail 14 in a similar manner as the slide lock clip 44 of the previous embodiment. Thus, in this embodiment the slide lock clip and spacer block can be formed as unitary piece.

As will be appreciated, the integral slide lock member 68 of this embodiment is configured to apply the first level of preload when installed to the rail 14 prior to securing the gas component 34 to the manifold blocks 18 and 22. To this end, the leg portions 72 are configured to be flexible so as to be flexed downward towards the rail 14 in order to permit engagement tangs 78 on distal ends thereof to engage a surface of the rail 14, such as lip 80. In this manner, after installation of the tangs 78 to the rail 14, a preload is applied to the manifold blocks 18 and 22. FIG. 10 illustrates both manifold blocks 18 and 22 supported on the rail 14 along with the integral slide lock member 68.

In FIG. 11 the gas component 34 is secured to the manifold blocks 18 and 22 via bolts 82. Like the previous embodiment, as the gas component 34 is secured to the manifold blocks 18 and 22, the integral slide lock member 68 tightens the manifold blocks 18 and 22 to the rail 14. This is accomplished via the compression of the central portion and/or leg portions of the integral slide lock member 68 interposed between the gas component and the rail 14.

As will be appreciated the rail 14 in this embodiment includes a plurality of optional slots 84 for receiving the tangs 78 of the integral slide lock member 68 when the gas component 34 is secured to the manifold blocks 18 and 22. The slots 84 are located below the lip 80 on each side of the rail 14. As will also be appreciated, the legs 72 can be flexed downward during the installation of the gas component 34 thereby allowing the tangs 78 to engage the slots 84 in order to secure the manifold blocks 18 and 22 to the rail 14. When the gas system component is attached, there will be a sideways gripping action that takes place as the slide lock is displaced.

Returning to FIG. 9, this gripping action is achieved as a result of a force tending to rotate the distal ends of the leg portions 72 inward towards each other that is developed as the integral slide lock member 68 is compressed between the gas component and the rail. As will be appreciated, the upper portion of the leg portions 72 in the uncompressed state extend above the uppermost surfaces of the manifold blocks 18 and 22. As such, when a gas component is secured to the manifold blocks, each leg portion 72 is forced downward thereby causing a moment to be applied to the leg portion 72 that results in the gripping action.

Turning to FIGS. 12 and 13, a slide lock gas delivery system 90 is illustrated having a heating element 92 (e.g., an electric heating element) for supplying heat to the gas flow passages of the manifold blocks 18 and 22 and/or gas component 34. The heating element 92 is provided in the channel 56 of the rail 14 on an underside of the manifold blocks 18 and 22. The remainder of the channel 56 can be filled with insulation 94. Flexible foam insulation can be used to provide an upward load to ensure intimate contact with the manifold substrates. The heating element 92 and/or insulation 94 can be secured to the rail 14 via an adhesive 96 or by any other suitable method.

Slide lock gas supply systems in accordance with the invention is capable of withstanding shipping shock and vibration without developing leaks. This is accomplished in the slide lock design by a variable load cantilever beam. The initial assembly of the gas system substrates with the slide lock system positions the substrate inlet and outlets in the approximate proper location and holds them with an axial force of approximately 14 lbs. A small amount of lateral adjustment is possible to allow the substrate to align with the upper gas component. When the gas component is fully installed, that is, tightened to the manifold substrates to affect a seal, the cantilever beam loading is changed by depressing the center. This results in a higher holding force (e.g., 28 pounds), effectively locking the manifold substrate in the optimum position.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A gas delivery system comprising:
    a rail for supporting at least one manifold block;
    first and second manifold blocks, each of the first and second manifold blocks having at least one port for connection to a gas component;
    a gas component securable to the first and second manifold blocks and having a mount surface with first and second ports for communicating with respective ports of the first and second manifold blocks when secured thereto; and
    a slide lock member for securing the first and second blocks to the rail;
    wherein the slide lock member is configured to secure the first and second manifold blocks to the rail under a first level of preload for assembly of the gas component to the manifold blocks, and wherein the slide lock member secures the first and second manifold blocks to the rail with a second level of preload greater than the first level when the gas component is secured to the manifolds.

2. A gas delivery system as set forth in claim 1, wherein the slide lock member includes a slide lock clip and a spacer block, the spacer block interposed between the first and second manifold blocks and adapted for spacing apart the first and second manifold blocks a predetermined distance and for supporting the slide lock member;

wherein the spacer block supports the slide lock clip at a central portion thereof at two support locations;

wherein the support locations are spaced apart from a longitudinal axis of the rail;

wherein the spacer block includes a recess or protrusion for mating with a corresponding recess or protrusion on at least one of the first and second manifold blocks to thereby interlock the spacer block with the manifold block;

wherein the spacer block supports the central portion of the slide lock clip near its outer edges to permit flexing of a deflectable portion of the central portion when the gas component is attached to the manifold blocks;

wherein the spacer block is deformable to allow relative movement between the first and second manifold blocks during attachment of the gas component;

wherein the slide lock clip has a central portion and respective leg portions extending from the central shaped portion for engaging the rail thereby trapping the at least one manifold block between the slide lock member and the rail;

wherein the central portion includes a deflectable portion that, when deflected, increases tension on at least one of the leg portions to thereby increase the preload to the second level;

wherein the slide lock clip is generally C-shape, and at least one distal end of the slide lock clip includes an interlock mechanism for interlocking with a surface of the rail; and wherein the rail includes a longitudinally extending channel between laterally spaced-apart manifold block support surfaces, and a heating element in the channel for providing heat to the gas components.

3. A gas delivery system as set forth in claim 1, wherein the slide lock member includes a slide lock clip and a spacer block, the spacer block interposed between the first and second manifold blocks and adapted for spacing apart the first and second manifold blocks a predetermined distance and for supporting the slide lock member; and wherein the slide lock clip and spacer block are formed as a unitary piece.

4. A modular gas supply manifold system as set forth in claim 1, wherein the slide lock member includes a slide lock clip and a spacer block for supporting the slide lock member, and wherein the spacer block includes a recess or protrusion for mating with a corresponding recess or protrusion on at least one of the first and second manifold blocks to thereby interlock the spacer block with the manifold block.

5. A modular gas supply manifold system comprising:
a rail for supporting at least one manifold block;
a manifold block having at least one port for connection to a gas component; and
a slide lock member for securing the manifold block to the rail;
wherein the slide lock member is configured to secure the manifold block to the rail under a first level of preload to facilitate securing a gas component to the manifold block, and wherein the slide lock member is configured to secure the manifold block to the rail under a second level of preload greater than the first level when the gas component is secured to the manifold.

6. A modular gas supply manifold system as set forth in claim 5, wherein the slide lock member includes a slide lock clip and a spacer block for supporting the slide lock member.

7. A modular gas supply manifold system as set forth in claim 6, wherein the spacer block supports the slide lock clip at a central portion thereof at two support locations.

8. A modular gas supply manifold system as set forth in claim 7, wherein the support locations are spaced apart from a longitudinal axis of the rail.

9. A modular gas supply manifold system as set forth in claim 6, wherein the spacer block is deformable to allow relative limited movement between the manifold block and slide lock member.

10. A modular gas supply manifold system as set forth in claim 6, wherein the slide lock member and spacer block are formed as a unitary piece.

11. A modular gas supply manifold system as set forth in claim 6, wherein the slide lock clip has a central portion and respective leg portions extending from the central portion for engaging the rail thereby trapping the at least one manifold block between the slide lock member and the rail.

12. A modular gas supply manifold system as set forth in claim 11, wherein the central portion includes a deflectable portion that, when deflected, increases tension on at least one of the leg portions to thereby increase the preload to the second level.

13. A modular gas supply manifold system as set forth in claim 11, wherein the spacer block supports the central portion of the slide lock member near its outer edges to permit deflection of the central portion when the gas component is attached to the manifold blocks.

14. A modular gas supply manifold system as set forth in claim 5, wherein the slide lock member slidingly engages at least one of the rail or the manifold block to permit relative movement therebetween when under the first level of preload.

15. A modular gas supply manifold system as set forth in claim 5, further comprising the gas component secured to the manifold block.

16. A modular gas supply manifold system as set forth in claim 5, wherein the slide lock member is generally C-shape, and at least one distal end of the slide lock member includes an interlock mechanism for interlocking with a surface of the rail.

17. A modular gas supply manifold system as set forth in claim 5, wherein the rail includes a longitudinally extending channel between laterally spaced-apart manifold block support surfaces, and a heat strip in the channel for providing heat to the gas components.

18. A slide lock member as set forth in claim 17, wherein the central spacer portion is deformable to allow relative movement between the first and second manifold blocks during attachment of a gas component.

19. A slide lock member as set forth in claim 17, wherein the slide lock member includes a slide lock clip having a general C-shape, and at least one distal end of the slide lock clip includes an interlock mechanism for interlocking with a surface of the rail when mounted thereto.

20. A slide lock member for securing a manifold block to a rail of a modular gas supply manifold comprising:
a central spacer portion for spacing apart a first and second manifold block on the rail; and
leg portions extending from the central spacer portion and adapted to engage the rail of a gas supply system;
wherein the slide lock member is configured to secure the manifold block to the rail under a first level of preload to facilitate securing a gas component to the manifold block, and wherein the slide lock member is configured to secure the manifold block to the rail under a second level of preload greater than the first level when a gas component is secured to the manifold.

21. A slide lock member as set forth in claim 20,
wherein the central spacer portion includes a recess or protrusion interlocking with a manifold block;
wherein the central spacer portion is deformable to allow relative movement between the first and second manifold blocks during attachment of a gas component; and
wherein the slide lock member includes a slide lock clip having a general C-shape, and at least one distal end of the slide lock clip includes an interlock mechanism for interlocking with a surface of the rail when mounted thereto.

22. A method of assembling a gas delivery system comprising the steps of:
mounting first and second manifold blocks to a support rail with a slide lock member, each of the first and second manifold blocks having at least one port for communicating with a port of a gas component, the slide lock member being adapted to secure the first and second manifold blocks to the rail with a first amount of preload; and
mounting a gas component to the first and second manifold blocks;
wherein the slide lock member is configured to secure the first and second manifold blocks to the rail under a first level of preload for assembly of the gas component to the manifold blocks, the first level of preload permitting relative movement between the rail and the manifold blocks, and wherein the slide lock member secures the first and second manifold blocks to the rail with a second level of preload greater than the first level when the gas component is mounted to the manifolds.

* * * * *